United States Patent
Sawodny et al.

(10) Patent No.: US 12,409,836 B2
(45) Date of Patent: Sep. 9, 2025

(54) METHOD AND EQUIPMENT FOR ESTIMATING A BRAKING FACTOR FOR A BRAKING SYSTEM FOR A VEHICLE

(71) Applicant: Knorr-Bremse Systeme Fuer Nutzfahrzeuge GmbH, Munich (DE)

(72) Inventors: Oliver Sawodny, Stuttgart (DE); Simon Goeltz, Winterbach (DE); Falk Hecker, Markgroeningen (DE); Ulrich Guecker, Schwieberdingen (DE); Roman Sauer, Stuttgart (DE); Adnan Mustapha, Maulbronn (DE)

(73) Assignee: Knorr-Bremse Systems Fuer Nutzfahrzeuge GmbH, Munich (DE)

( * ) Notice: Subject to any disclaimer, the term of this patent is extended or adjusted under 35 U.S.C. 154(b) by 166 days.

(21) Appl. No.: 18/041,273

(22) PCT Filed: Aug. 19, 2021

(86) PCT No.: PCT/EP2021/073024
§ 371 (c)(1),
(2) Date: Feb. 10, 2023

(87) PCT Pub. No.: WO2022/048915
PCT Pub. Date: Mar. 10, 2022

(65) Prior Publication Data
US 2023/0322223 A1 Oct. 12, 2023

(30) Foreign Application Priority Data
Sep. 4, 2020 (EP) .................... 20194710

(51) Int. Cl.
*B60W 30/18* (2012.01)
*B60T 8/171* (2006.01)
*B60T 8/172* (2006.01)

(52) U.S. Cl.
CPC ....... *B60W 30/18109* (2013.01); *B60T 8/171* (2013.01); *B60T 8/172* (2013.01); *B60W 2520/28* (2013.01)

(58) Field of Classification Search
CPC ......... B60W 30/18109; B60W 2520/28; B60T 8/171; B60T 8/172
(Continued)

(56) References Cited

U.S. PATENT DOCUMENTS 5,136,508 A * 8/1992 Bannon .................. B60T 8/175
702/132
5,646,849 A * 7/1997 Walenty ................ B60T 8/1764
303/155

(Continued)

FOREIGN PATENT DOCUMENTS

DE 10328028 A1 * 1/2005 ............ B60T 8/1708
DE 19954198 B4 * 8/2011 .............. B60T 8/172

(Continued)

OTHER PUBLICATIONS

Zhang,Xinetal. "InfluenceofBrakingConditionsonTribologicalPerformanceofCopper-BasedPowder Metallurgical Braking Material."Journalofmaterialsengineeringandperformance27.9(2018):4473-4480.Web. (Year: 2018).*

(Continued)

*Primary Examiner* — Ramya P Burgess
*Assistant Examiner* — Keith A von Volkenburg
(74) *Attorney, Agent, or Firm* — Greenberg Traurig, LLP

(57) ABSTRACT

Method and equipment for estimating a braking factor for a braking system for a vehicle. The method includes estimating a braking factor ($k_{brk}$) for a braking system for a vehicle, in which the braking factor ($k_{brk}$) is by applying the following equation: $k_{brk} = a + b \cdot v_{veh} + c \cdot p_{brk} + d \cdot T_{brk} + f \cdot p_{brk}^2$, in which a, b, c, d and f are model parameters, $v_{veh}$ is a velocity (Continued)

of the vehicle, $p_{brk}$ is a braking pressure, and $T_{brk}$ is a brake temperature.

13 Claims, 2 Drawing Sheets

(58) Field of Classification Search
USPC .......................................................... 701/70
See application file for complete search history.

(56) References Cited

U.S. PATENT DOCUMENTS

| | | | | |
|---|---|---|---|---|
| 5,892,437 | A * | 4/1999 | Scheibe | F16D 66/021 |
| | | | | 73/132 |
| 6,061,620 | A * | 5/2000 | Wuerth | B60T 13/662 |
| | | | | 180/197 |
| 6,149,251 | A * | 11/2000 | Wuerth | B60T 8/17555 |
| | | | | 303/146 |
| 6,254,203 | B1 | 7/2001 | Arnold | |
| 2005/0261818 | A1 * | 11/2005 | Brown | B60T 7/22 |
| | | | | 701/70 |
| 2012/0226402 | A1 | 9/2012 | Minamiura | |
| 2013/0278771 | A1 * | 10/2013 | Magoun | H04N 23/23 |
| | | | | 348/148 |
| 2014/0014451 | A1 * | 1/2014 | Nakata | B60T 8/267 |
| | | | | 188/358 |
| 2016/0138665 | A1 * | 5/2016 | Antanaitis | B60T 17/22 |
| | | | | 701/70 |
| 2020/0156602 | A1 | 5/2020 | Wiehen | |

FOREIGN PATENT DOCUMENTS

| | | | | |
|---|---|---|---|---|
| EP | 0405114 | A1 | 1/1991 | |
| EP | 166258 | B2 * | 9/1992 | B60T 8/175 |
| EP | 2074004 | B2 * | 12/2022 | B60T 8/1708 |
| WO | 2005058665 | A1 | 6/2005 | |
| WO | 2008044980 | A1 | 4/2008 | |
| WO | WO-2022048884 | A1 * | 3/2022 | B60T 17/221 |

OTHER PUBLICATIONS

Widjiantoro, Bambang L, and Katherin Indriawati. "Sensor/Actuator Fault Tolerant Sliding Mode Control for Anti-Lock Braking in a Quarter Electric Vehicle." International Journal of Power Electronics and Drive Systems 11.3 (2020): 1220-. Web. (Year: 2020).*

International Search Report for PCT/EP2021/073024, Issued Jul. 12, 2021.

* cited by examiner

METHOD AND EQUIPMENT FOR ESTIMATING A BRAKING FACTOR FOR A BRAKING SYSTEM FOR A VEHICLE

CROSS-REFERENCE TO RELATED APPLICATIONS

This is a national stage application claiming priority to international patent application Serial No.: PCT/EP2021/073024, filed on Aug. 19, 2021, which claims priority to patent application Serial No.: EP 20194710.8, filed on Sep. 4, 2020; which are herein incorporated by reference in their entirety.

FIELD OF THE INVENTION

The present invention relates to a method for estimating a braking factor for a braking system for a vehicle, a method for estimating a braking torque for a braking system for a vehicle, an equipment for estimating a braking factor for a braking system for a vehicle, and a corresponding computer program product.

BACKGROUND INFORMATION

For brake control applications as ABS (anti-lock braking system) or ESP (electronic stability control) an estimation of effective tire forces is required or at least advantageous. The braking torque can provide a major contribution to such estimation, if available. However, only the braking pressure is measured or set, respectively, from which the braking torque may be calculated in accordance with a braking factor. The braking factor has to be modelled and/or estimated due to its dependency on environmental conditions and vehicle characteristics.

Hitherto, the braking factor is assumed as a constant. Accordingly, an imprecise calculation of the braking force is corrected by a control comprising wheel speed and acceleration measurements.

SUMMARY OF THE INVENTION

Accordingly, it is an object of the present invention to provide a method and equipment for estimating a braking factor for a braking system for a vehicle and thereby enabling an estimation of a braking torque in an easy and more accurate manner.

The object is solved by a method for estimating a braking factor for a braking system for a vehicle according to the description herein, a method for estimating a braking torque for a braking system for a vehicle according to the description herein, an equipment for estimating a braking factor for a braking system for a vehicle according to the description herein, and a computer program product according to the description herein. Further aspects of the present invention are subject of the further descriptions herein.

According to the inventive method for estimating a braking factor for a braking system for a vehicle, the braking factor is estimated by applying the following equation:

$$k_{brk} = a + b \cdot v_{veh} + c \cdot p_{brk} + d \cdot T_{brk} + f \cdot p_{brk}^2 \qquad (1),$$

wherein $k_{brk}$ is the braking factor, a, b, c, d and f are model parameters, $v_{veh}$ is a velocity of the vehicle, $p_{brk}$ is a braking pressure, and $T_{brk}$ is a brake temperature.

Equation (1) describes the dependency of the braking factor on the varying braking parameters $v_{veh}$, $p_{brk}$ and $T_{brk}$.

The braking factor is therefore adapted in accordance with applicable braking conditions for a concrete braking action.

The parameters describe the effects on the braking factor: a describes a constant base-brake-factor, b the decreasing braking factor over velocity due to lower slip forces at higher relative velocities between braking disk and braking pad, d the decreasing braking factor over temperature caused by material characteristics and the parameters c and f describe the nonlinear influence of the brake pressure, which is assumed to be quadratic here. This influence is caused by deformation of the braking pad due to the acting pressure and forces respectively.

Advantageously, the model parameters a, b, c, d and f are established by transferring experimental data into a braking factor model.

The model parameters a, b, c, d and f are coefficients to arrive or at least to approximate the braking factor model based on experimental data in dependence on the braking parameters $v_{veh}$, $p_{brk}$ and $T_{brk}$.

The point cloud is filtered by the variables, e.g. established as experimental data, which may be under boundary conditions as described later. Then, for example, a least-squares algorithm is applied to find the optimal parameters a,b,c,d, and f that minimises the squared error between the measured brake torque $M_{brk,meas}$ and the calculated brake torque $M_{brk,calc} = (a + b \cdot v_{veh,meas} + c \cdot p_{brk,meas} + d \cdot T_{brk,meas} + f \cdot p_{brk,meas}^2) \cdot p_{brk,meas}$ from measured brake pressure $p_{brk,meas}$, measured brake temperature $T_{brk,meas}$ and measured velocity $v_{veh,meas}$.

$$\min_{a,b,c,d,f} (M_{brk,meas} - M_{brk,calc})^2$$

If there exist more measurement points than parameters (in this exemplary case more than 5), this method finds the optimal parameters with the minimum error between measurement and model, weighting all measurements equal.

In some embodiments, the experimental data is established by test-bench tests, in particular during performance tests of braking pad-braking disk pairings.

Test-bench tests provide standardized data under defined boundary conditions. The experimental data is therefore comprehensible. In particular, the concrete braking pad-braking disk pairings also provide data for specific material pairings and other factors associated with such concrete pairing.

The experimental data may be established for tests wherein the braking pressure is equal to or greater than a predetermined threshold, which may be equal to or greater than 0.05 bar, a wheel velocity is equal to or greater than a predetermined threshold, which may be equal to or greater than 1 km/h, pressure changes are equal to or less than a predetermined threshold, which may be equal to or less than 0.1 bar/s, and/or the brake temperature is equal to or greater than a predetermined threshold, which may be equal to or greater than 200° C.

Experimental data, for example respective test-bench data, are filtered with respect to the above thresholds. Such filtering reduces the number of data to be considered to the relevant one. Any braking factor resulting from a braking pressure of less than 0.05 bar may not be considered as relevant as not providing any effective braking action. Accordingly, any wheel velocity less than 1 km/h may not represent a realistic driving scheme. Pressures that change more than 0.1 bar/s are not considered to be stationary and may result in inconsistent measurement results. Similarly, the measurement results may not be reproducible in a reliable range when the brake temperature is less than 200° C.

Advantageously, the model factors a, b, c, d, and f are established depending on respective material pairings of a braking pad and a braking disk.

As already addressed with respect to the test-bench tests, different material parings may also affect the braking factor. Accordingly, the model factors a, b, c, d, and f may also represent the effect of different material pairings. Model factors a, b, c, d, and f for different material pairings may be stored in a data base to be provided on demand.

The method according to any one of the preceding embodiments, wherein the velocity of the vehicle ($v_{veh}$), the braking pressure ($p_{brk}$) and/or the brake temperature ($T_{brk}$) are established as actual sensor data and/or control data.

The values for the braking parameters $v_{veh}$, $p_{brk}$ and $T_{brk}$ may be derived from set values of a control and/or determined values, for example, by respective measurements. Alternatively or in addition, values for the braking parameters $v_{veh}$, $p_{brk}$ and $T_{brk}$ may be estimated and/or calculated. Values for different braking parameters may be derived differently in alignment with the afore-mentioned options. Additionally, a braking parameter may be derived by more than one of these options for redundancy reasons, to validate the credibility of results and/or calculate average values with or without the consideration of weighing factors.

In another aspect, the invention also relates to a method for estimating a braking torque $M_{brk}$ for a braking system for a vehicle, comprising the following steps:
  determination of an actual velocity of the vehicle, braking pressure and brake temperature,
  determination of an estimated braking factor according to method describe above, and
  determination of an estimated braking torque by applying the following equation:

$$M_{brk}=k_{brk}*p_{brk} \quad (2).$$

The actual velocity of the vehicle, braking pressure and brake temperature as braking parameters are applied to equation (1). Further, the braking pressure is also applied to equation (2).

In some embodiments, the estimated braking factor is determined by being calculated and/or by selecting stored estimated braking factors depending on the actual velocity of the vehicle, the braking pressure and the brake temperature.

A combination of determining the estimated braking factor by calculations and by selecting stored data may be applied for intermediate values of braking parameters and/or actual braking parameters deviating from the stored ones by a predetermined amount. For the calculation of the estimated braking factor and/or the braking factors to be stored, equation (1) is applied.

In some embodiments, the estimated braking torque is determined by being calculated and/or by selecting stored estimated braking torques depending on the actual velocity of the vehicle, the braking pressure and the brake temperature.

The braking torque may be calculated by calculating the braking factor first as separate value according to equation (1) followed by a calculation according to equation (2). Alternatively or in addition, the braking torque may be calculated by directly inserting equation (1) into (2) as $M_{brk}=(a+b*v_{veh}+c*p_{brk}+d*T_{brk}+f*p_{brk}^2)*p_{brk}$ without explicitly handling the braking factor as separate value.

However, the braking factor as separate value may be established for purposes other than estimating the braking torque.

Alternatively or in addition, different braking torques estimated by the above method are stored in a data base for being selected depending on the actual braking parameters.

The selection of stored data combined with calculations may, for example, be applied for intermediate values of braking parameters to interpolate a respective braking torque or to apply equation (2) for braking parameters not stored in a data base or deviating from the stored data by a predetermined amount.

In another aspect, the invention also relates to an equipment for estimating a braking factor for a braking system for a vehicle, comprising at least one signal inlet for receiving data of a velocity of the vehicle, a braking pressure and a brake temperature and a converter device configured to convert the received data into an estimated braking factor as described above.

In view of the velocity of the vehicle, a braking pressure, and a brake temperature, the at least one inlet receives sensor data to provide corresponding values. The sensor data may be directly transferred as sensor signal or processed before being received via the at least one signal inlet. Any optional data processing for any of the velocity of the vehicle, the braking pressure, and/or the brake temperature may be provided independently from any other of the braking parameters. For example, velocity of the vehicle and the brake temperature are averaged over a predetermined short period while the braking pressure signal is received as it is. Alternatively or in addition, the velocity of the vehicle, the braking pressure, and/or the brake temperature may be received as control data as per set values. A combination of sensor and control data may relate to the use of sensor or control data depending on the respective braking parameter, e.g. using a set velocity of the vehicle and braking pressure while measuring the brake temperature. Alternatively or in addition, a combination of sensor and control data may also be applied to at least one single braking parameter for redundancy reasons, to validate the credibility of results and/or calculate average values with or without the consideration of weighing factors.

In some embodiments, the converter device is configured to calculate the estimated braking factor based on stored model parameters and received data values, and/or configured to select stored estimated braking factors depending on received data values.

The converter may therefore at least provide a calculating unit configured to calculate the estimated braking factor based on stored model parameters and received data values and/or a storage unit configured to store estimated braking factors depending on received data values and/or the model parameters. The model parameters may be stored for different material pairings of braking disks and braking pads.

Advantageously, the converter device is configured to convert the estimated braking factor into an estimated braking torque $M_{brk}$ as per $M_{brk}=k_{brk}*p_{brk}$ (equation (2)).

The converter device may determine the estimated braking factor and estimated braking torque separately. However, the converter device may also be configured to directly determining the braking torque by directly inserting equation (1) into (2) as $M_{brk}=(a+b*v_{veh}+c*p_{brk}+d*T_{brk}+f*p_{brk}^2)*p_{brk}$ without explicitly handling the braking factor as separate value.

In another aspect the invention also relates to a computer program product comprising instructions which, when the program is executed by a computer, cause the computer to carry out any of the afore-mentioned methods to estimate a braking factor and/or braking torque for a braking system for a vehicle.

Further advantages, aspects and details of the present invention are described herein, the following description of exemplary embodiments applying the principles of the invention and drawings.

DETAILED DESCRIPTION

Figure 1:
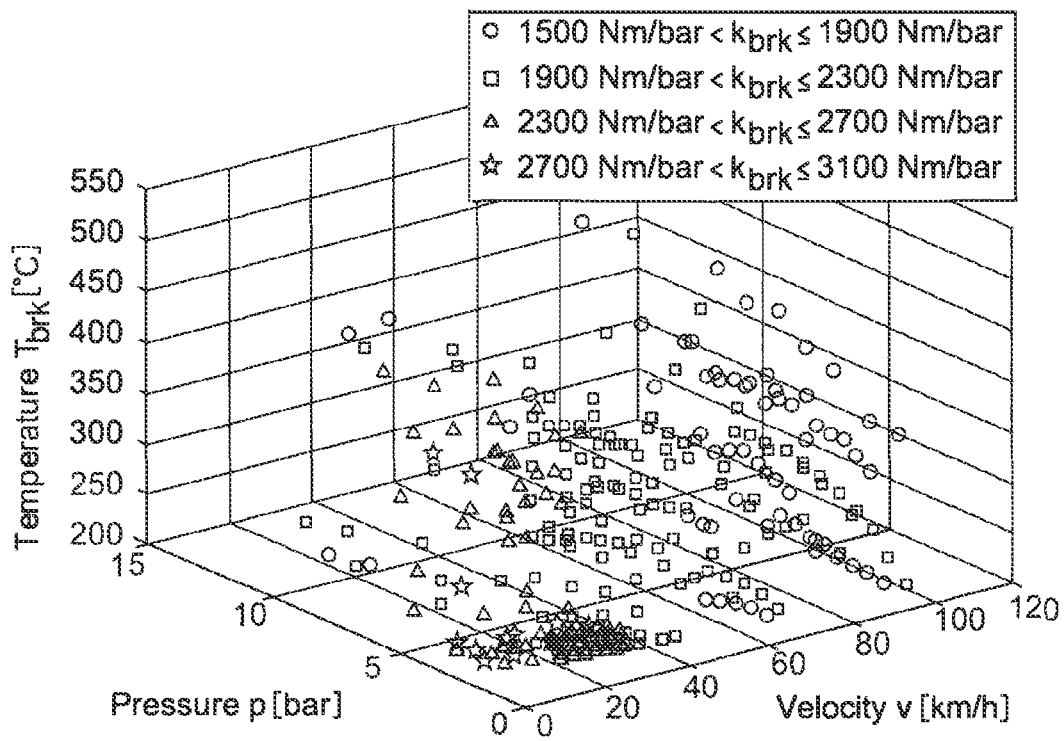
FIG. 1 is a point cloud of experimental data of different braking factors depending on a velocity of a vehicle, a braking pressure and a brake temperature.

FIG. 1 shows a three-dimensional plot of braking factors. Each braking factor $k_{brk}$ corresponds to a velocity $v_{veh}$ of a vehicle in [km/h] and a braking pressure $p_{brk}$ in [bar], each of both as an axis of coordinates in a horizontal plane. Each braking factor $k_{brk}$ further corresponds to brake temperature $T_{brk}$ plotted on a vertical axis.

The braking factors $k_{brk}$ in FIG. 1 are results of test-bench tests with a braking pressure $p_{brk}$ being equal to or greater than 0.05 bar, a wheel speed being equal to or greater than 1 km/h and stationary pressures $p_{brk}$ with changes $|\Delta p_{brk}|$ being equal to or less than 0.1 bar/s. Further, a braking temperature $T_{brk}$ above equal to or above 200° C. provides more consistent results. FIG. 1 shows all datapoints from a measurement but for the model only measurements with brake temperatures higher than 200° C. may be used. Braking factors $k_{brk}$ represented by a circle correspond to 1500 Nm/bar $<k_{brk}\leq$1900 Nm/bar, braking factors $k_{brk}$ represented by a square correspond to 1900 Nm/bar $<k_{brk}\leq$2300 Nm/bar, braking factors $k_{brk}$ represented by a triangle correspond to 2300 Nm/bar $<k_{brk}<$2700 Nm/bar, and braking factors $k_{brk}$ represented by a star correspond to 2700 Nm/bar $<k_{brk}<$3100 Nm/bar.

Figure 2:
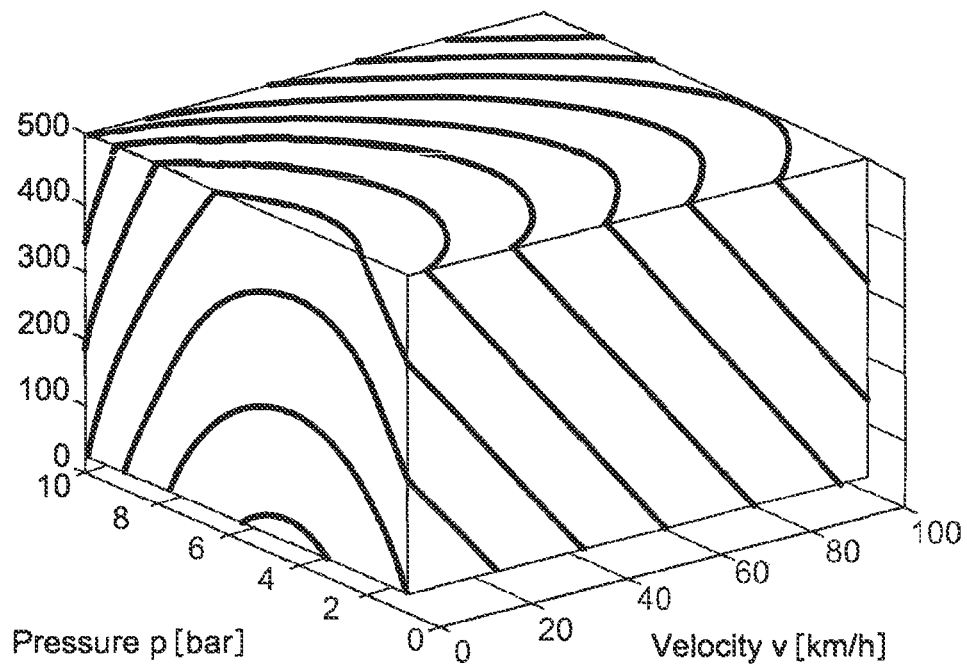
FIG. 2 is a braking factor model based on the point cloud of FIG. 1.

FIG. 2 shows a braking factor model based on the point cloud of FIG. 1, wherein the lines corresponds to the representation of different braking factors $k_{brk}$. The transfer of the point cloud according to FIG. 1 into a braking factor model as per FIG. 2 allows the determination of the model factors a, b, c, d and f for estimating the braking factor $k_{brk}$ as $$k_{brk}=a+b^*v_{veh}+c^*p_{brk}+d^*T_{brk}+f^*p_{brk}^2 \quad (1),$$

wherein a, b, c, d and f are model parameters, $v_{veh}$ is a velocity of the vehicle, $p_{brk}$ is a braking pressure, and $T_{brk}$ is a brake temperature.

The point cloud is filtered by the variables established as experimental data. Then a least-squares algorithm is applied to find the optimal parameters a,b,c,d, and f that minimises the squared error between the measured brake torque $M_{brk,meas}$ and the calculated brake torque $M_{brk,calc}=(a+b^*v_{veh,meas}+c^*p_{brk,meas}+d^*T_{brk,meas}+f^*p_{brk,meas}^2)^*p_{brk,meas}$ from measured brake pressure $p_{brk,meas}$, measured brake temperature $T_{brk,meas}$ and measured velocity $v_{veh,mes}$:

$$\min_{a,b,c,d,f}(M_{brk,meas}-M_{brk,calc})^2$$

If there exist more measurement points than parameters (in this case more than 5), this method finds the optimal parameters with the minimum error between measurement and model, weighting all measurements equal.

As a result, each parameter combination of a velocity $v_{veh}$ of a vehicle, a braking pressure $p_{brk}$ and a brake temperature $T_{brk}$ within the respective ranges covered by the braking factor model may provide an estimated braking factor $k_{brk}$ calculated as per the above equation (1). The model parameters are adapted to approximate the braking factor model accordingly.

Figure 3:
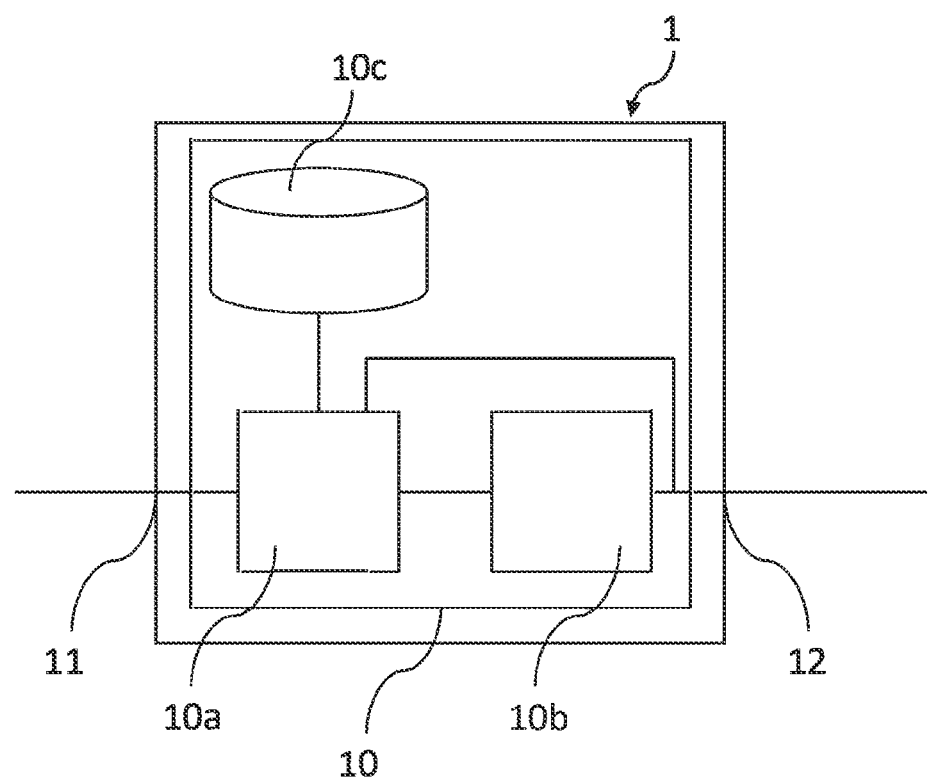
FIG. 3 is a scheme of an equipment to estimate a braking factor according to an exemplary embodiment.

FIG. 3 is a scheme of an equipment 1 to estimate a braking factor according an exemplary embodiment. The equipment 1 comprises a signal inlet for receiving a velocity $v_{veh}$ of a vehicle, a braking pressure $p_{brk}$ and a brake temperature $T_{brk}$, respectively. However, these braking parameters may also be received by a plurality of separated signal inlets. The received braking parameters are transferred to a converter 10. The converter 10 of the embodiment of FIG. 3 comprises a calculating unit 10a for estimating a braking factor $k_{brk}$, a calculating unit 10b for estimating a braking torque $M_{brk}$, and a storage unit 10c. The calculating unit 10a for estimating a braking factor $k_{brk}$ receives the velocity $v_{veh}$ of the vehicle, the braking pressure $p_{brk}$ and the brake temperature $T_{brk}$ via the signal inlet 11. Further, the calculating unit 10a for estimating a braking factor $k_{brk}$ receives the model parameters a, b, c, d and f stored in the storage unit 10c. The calculating unit 10a for estimating a braking factor $k_{brk}$ then estimates the braking factor as per equation (1). Instead of calculating the braking factor $k_{brk}$, the storage unit 10c may provide already calculated and stored values for the braking factor $k_{brk}$.

The estimated braking factor $k_{brk}$ may be used for different purposes. As per the embodiment in FIG. 3 the braking factor $k_{brk}$ is transferred to the calculating unit 10b to further convert the braking factor $k_{brk}$ into a braking torque $M_{brk}$ by applying equation (2). Similar to the estimation of the braking factor $k_{brk}$, the braking torque may be selected out of stored data calculated in advance instead of being calculated upon each request.

The braking factor $k_{brk}$ and/or the braking torque $M_{brk}$ may be transmitted via a signal outlet 12 to other applications as input data for different monitoring applications and/or control applications as ABS (anti-lock braking system) or ESP (electronic stability control).

The invention has been described in conjunction with various embodiments herein. However, other variations to the disclosed embodiments can be understood and effected by those skilled in the art in practicing the present invention, from a study of the drawings, the disclosure and the appended claims. Such modifications may involve other features, which are already known in the art and may be used instead of or in addition to features already described herein. In the claims, the word "comprising" does not exclude other elements or steps, and the indefinite article "a" or "an" does not exclude a plurality.

THE LIST OF REFERENCE SIGNS IS AS FOLLOWS 1 equipment
10 converter device
10a calculating unit (braking factor)
10b calculating unit (braking torque)
10c storage unit
11 signal inlet
12 signal outlet

The invention claimed is:

1. A method comprising:
    detecting, via a sensor, sensor data which includes a brake temperature;
    a device receiving the sensor data from the sensor;
    determining, via the device, an estimation of a braking factor ($k_{brk}$) according to:
    $k_{brk}=a+b^*v_{veh}+c^*p_{brk}+d^*T_{brk}+f^*p_{brk}^2$,
    wherein a, b, c, d, and f are model parameters,
    $v_{veh}$ is a velocity of a vehicle,
    $p_{brk}$ is a braking pressure, and
    $T_{brk}$ is the brake temperature;
    determining an estimation of a braking torque ($M_{brk}$) from the braking factor ($k_{brk}$); and
    applying the braking factor ($k_{brk}$) and/or the braking torque ($M_{brk}$) to an anti-lock braking system and/or electronic stability control system of the vehicle.

2. The method of claim 1, wherein the model parameters a, b, c, d, and f are established by transferring experimental data into a braking factor model.

3. The method of claim 2, wherein the experimental data is established by test-bench tests, during performance tests of braking pad and braking disk pairings.

4. The method of claim 2, wherein the experimental data is established for tests wherein the braking pressure ($p_{brk}$) is equal to or greater than a predetermined threshold, a wheel velocity ($v_{wheel}$) is equal to or greater than a predetermined threshold, and a pressure changes ($|\Delta p_{brk}|$) are equal to or less than a predetermined threshold, and/or the brake temperature ($T_{brk}$) is equal to or greater than a predetermined threshold.

5. The method of claim 2, wherein the experimental data is established for tests wherein the braking pressure ($p_{brk}$) is equal to or greater than a predetermined threshold, which is equal to or greater than 0.05 bar, a wheel velocity ($v_{wheel}$) is equal to or greater than a predetermined threshold, which is equal to or greater than 1 km/h, and a pressure changes ($|\Delta p_{brk}|$) are equal to or less than a predetermined threshold, which is equal to or less than 0.1 bar/s, and/or the brake temperature ($T_{brk}$) is equal to or greater than a predetermined threshold, which is equal to or greater than 200° C.

6. The method of claim 1, wherein the model factors a, b, c, d, and f are established depending on respective material pairings of a braking pad and a braking disk.

7. The method of claim 1, wherein the velocity of the vehicle ($v_{veh}$), the braking pressure ($p_{brk}$), or both are established as actual sensor data and/or control data.

8. A method comprising:
    determining, via at least one or more sensors,
        a velocity of a vehicle ($v_{veh}$),
        a braking pressure ($p_{brk}$), and
        a brake temperature ($T_{brk}$);
    a converter device receiving the velocity of the vehicle ($v_{veh}$), the braking pressure ($p_{brk}$), and the brake temperature ($T_{brk}$) from the one or more sensors;
    determining, via the converter device, an estimated braking factor ($k_{brk}$), and an estimated braking torque ($M_{brk}$) according to:
    $M_{brk}=k_{brk}^*p_{brk}$;
    wherein the estimated braking factor ($k_{brk}$) is according to:
    $k_{brk}=a+b^*v_{veh}+c^*p_{brk}+d^*T_{brk}+f^*p_{brk}^2$,
    wherein a, b, c, d, and f are model parameters; and
    applying the braking torque ($M_{brk}$) to an anti-lock braking system and/or electronic stability control system of the vehicle.

9. The method of claim 8, wherein the estimated braking factor ($k_{brk}$) is determined by being calculated and/or by selecting stored estimated braking factors ($k_{brk}$) depending on an actual velocity of the vehicle ($v_{veh}$), the braking pressure ($p_{brk}$) and the brake temperature ($T_{brk}$).

10. The method of claim 8, wherein the estimated braking torque ($M_{brk}$) is determined by being calculated and/or by selecting stored estimated braking torques ($M_{brk}$) depending on an actual velocity of the vehicle ($v_{veh}$), the braking pressure ($p_{brk}$) and the brake temperature ($T_{brk}$).

11. An apparatus for a braking system for a vehicle, comprising:
    at least one signal inlet configured to receive sensor data, wherein the sensor data includes one or more of a velocity of the vehicle ($v_{veh}$), a braking pressure ($p_{brk}$), and a brake temperature ($T_{brk}$);
    a converter device that converts the received sensor data into an estimated braking factor ($k_{brk}$),
    wherein the estimated braking factor ($k_{brk}$) is according to:
    $k_{brk}=a+b^*v_{veh}+c^*p_{brk}+d^*T_{brk}+f^*p_{brk}^2$,
    wherein a, b, c, d, and f are model parameters; and
    at least one signal outlet configured to transmit the estimated braking factor ($k_{brk}$) to an anti-lock braking system and/or electronic stability control system of the vehicle, wherein the anti-lock braking system and/or electronic stability control system is configured to apply the estimated braking factor ($k_{brk}$) thereto.

12. The apparatus of claim 11, wherein the converter device is configured to calculate the estimated braking factor ($k_{brk}$) based on stored model parameters and received data values, and/or configured to select stored estimated braking factors ($k_{brk}$) depending on received data values.

13. The apparatus of claim 11,
    wherein the converter device is configured to convert the estimated braking factor ($k_{brk}$) into an estimated braking torque ($M_{brk}$) as per $M_{brk}=k_{brk}^*p_{brk}$, wherein the at least one signal outlet is configured to transmit the estimated braking torque ($M_{brk}$) to the anti-lock braking system and/or electronic stability control system of the vehicle, wherein the anti-lock braking system and/or electronic stability control system is configured to apply the estimated braking torque ($M_{brk}$) thereto.

* * * * *